UNITED STATES PATENT OFFICE.

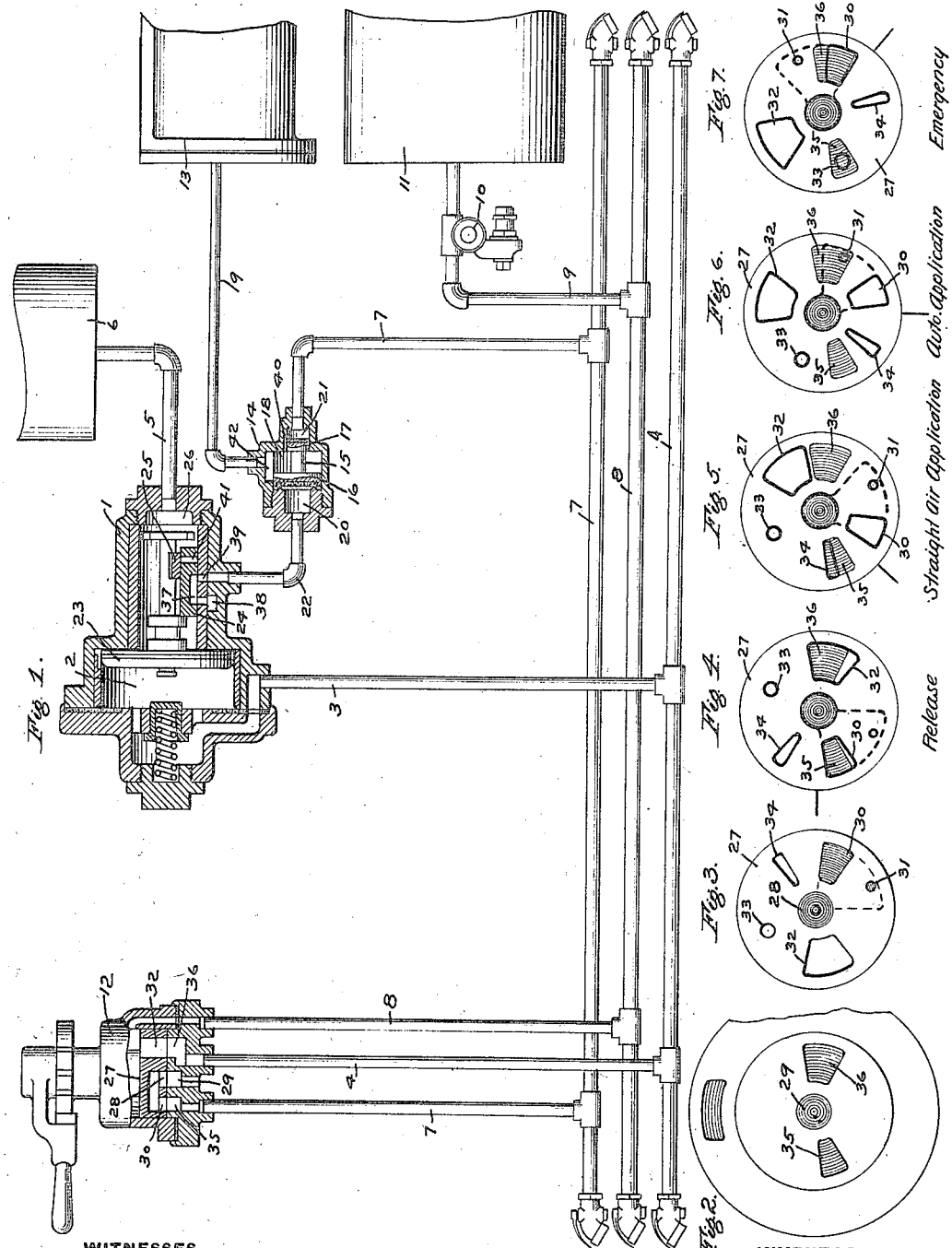

WALTER V. TURNER, OF EDGEWOOD, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

COMBINED AUTOMATIC AND STRAIGHT-AIR BRAKE.

971,806.          Specification of Letters Patent.         Patented Oct. 4, 1910.

Application filed April 6, 1908. Serial No. 425,491.

*To all whom it may concern:*

Be it known that I, WALTER V. TURNER, a citizen of the United States, residing at Edgewood, in the county of Allegheny and State of Pennsylvania, have invented new and useful Improvements in Combined Automatic and Straight-Air Brakes, of which the following is a specification.

This invention relates to fluid pressure brakes, and more particularly to a combined automatic and straight air brake apparatus.

One important application of my improvements is in electric traction service where at times cars are operated singly, in which case the direct or straight air brake constitutes a very desirable and flexible brake, while at other times where cars are operated in trains the reasons are well known for employing an automatic brake.

In view of the above, one object of my invention is to provide an improved and simple brake apparatus of the above character adapted through manipulation of a single brake valve to provide a direct or straight air brake or an automatic brake as desired.

Another object of my invention is to provide means in connection with a combined automatic and direct air brake for augmenting the brake cylinder pressure in an emergency application or after a full service application of the brakes, said means being adapted to first close the direct air passage to the brake cylinder upon flow of air from the automatic valve device and then open the direct air passage to supply air to the brake cylinder to augment the pressure therein.

Another object of my invention is to provide a combined automatic and direct or straight air brake having means for augmenting the brake cylinder pressure from the direct air supply in an emergency application of the brakes and adapted upon flow of air from said direct air passage to close communication to the automatic valve device or triple valve, so that a corresponding increase in pressure in the auxiliary reservoir and on the triple valve piston is prevented and the subsequent release of the brakes may then be readily attained.

Still another object of my invention is to provide an improved double check valve device for controlling the flow of air from two different sources of pressure to a common receptacle, said valve device having differential piston heads whereby the flow of air from one source of pressure first closes the communication from the other source and then opens said communication to supply further fluid therefrom to the common receptacle.

In the accompanying drawing: Figure 1 is a diagrammatic view of a car air brake equipment with my improvements applied thereto and showing certain parts of the apparatus in section; Fig. 2 a plan view of the valve seat for the rotary valve of the motorman's brake valve, showing the location of ports therein; Fig. 3 a face view of the rotary valve, showing the arrangement of ports and cavities; and Figs. 4 to 7 inclusive diagrams illustrating the relative positions of the rotary valve in release, straight air application, automatic service application, and emergency application positions respectively.

According to this construction, the apparatus on a car may comprise, as shown in Fig. 1 of the drawing, an automatic valve device or triple valve 1 having the usual piston chamber 2 connected by a branch pipe 3 to train pipe 4, and a valve chamber 26 connected by pipe 5 to auxiliary reservoir 6, a straight air pipe line 7, an air supply or control pipe line 8 connected by branch pipe 9, containing the usual feed or reducing valve device 10, with main reservoir 11, a brake valve 12 connected to the several train pipe lines, and a brake cylinder 13.

In addition to the above apparatus I provide a double check valve device 14 containing a double seated differential piston 15, the two piston heads 16 and 17 of which divide the check valve casing into an intermediate chamber 18, communicating through brake cylinder pipe 19 with the brake cylinder 13, and outer chambers 20 and 21 adjacent the respective piston heads 16 and 17, the chamber 20 being in open communication with the automatic supply pipe 22, and chamber 21 with independent or straight air pipe 7.

The automatic valve device 1 may comprise a triple valve piston 23 contained in piston chamber 2 and a main slide valve 24 on which is mounted a graduating or auxiliary slide valve 25, said valves being contained in valve chamber 26.

The brake valve 12 comprises a rotary valve 27 provided with through ports 32, 33 and 34, and an exhaust cavity having a central port 28, adapted to register with exhaust port 29 in the valve seat, and other ports 30 and 31. In addition to the exhaust port 29 the rotary valve seat is provided with ports 35 and 36 leading respectively to the direct or straight air pipe 7 and the automatic train pipe 4. The control pipe 8 communicates with the chamber above the rotary valve 27 for supplying fluid under pressure thereto. In the release position of the brake valve, as shown in Fig. 4, through port 32 registers with train pipe port 36, so that fluid under pressure, according to the adjustment of feed valve 10, is charged into the train pipe and thence flows to triple valve chamber 2 and around the triple valve piston to valve chamber 26 and auxiliary reservoir 6, charging the parts to the normal standard pressure in the usual manner. In this position the straight air port 35 is connected through ports 30 and 28 with exhaust port 29, so that the straight air pipe is open to the atmosphere. In the release position of the triple valve piston a cavity 37 in the main slide valve connects exhaust port 38 with port 39 leading to brake cylinder supply pipe 22, thus it will be seen that the chamber 20 at the outer face of piston head 16 is open to the atmosphere.

In order to make a straight air application of the brakes, the brake valve handle is turned to straight air application position, as illustrated in Fig. 5, in which position, through port 34 in rotary valve 27 registers with straight air port 35, so that air under pressure is admitted to pipe 7 and to the outer face of piston head 17. As the head 16 is subject on its outer face to the atmosphere through cavity 37 in the main slide valve 24, the fluid pressure on the head 17 shifts the piston over and causes the head 16 to seat and close communication from brake cylinder to pipe 22, at the same time a passage 40 is opened around piston head 17, so that fluid under pressure in straight air pipe 7 flows into chamber 18 and thence through pipe 19 to the brake cylinder. By moving the brake valve handle to straight air lap position the flow of air to the straight air pipe may be cut off, and by again moving the handle to straight air application position the pressure in the brake cylinder may be further increased as desired. In moving the brake valve from straight air application to the straight air lap position the through port 32 is adapted to partly register with train pipe port 36, so as to maintain the pressure in the train pipe and supply air thereto in case of leakage. The brakes may then be released by turning the brake valve handle to release position, Fig. 4, in which the straight air pipe is connected to the atmosphere so that fluid from the brake cylinder flows through passage 40 and straight air pipe to the atmosphere. If it is desired to make an automatic service application of the brakes, the brake valve handle is turned to the automatic application position, as shown in Fig. 6, in which the small exhaust port 31 registers with train pipe port 36. Air is thus vented from the train pipe in the desired amount and the brake valve is then returned to the automatic lap position in the usual manner. The reduction in train pipe pressure causes the piston 23 of the triple valve device to move the main slide valve 24 and the graduating valve 25 to service application position, so that air is admitted from the auxiliary reservoir 6 through main slide valve port 41 to port 39, pipe 22, and chamber 20. The piston 15 is thus shifted by the fluid pressure acting on the outer face of piston head 16, so that the head 17 closes the passage 40, while the piston head 16 uncovers the groove 42 and thus permits air to flow from the auxiliary reservoir and chamber 20 through the groove 42 to brake cylinder pipe 19 and the brake cylinder. The flow of air continues until the triple valve piston is moved back to lap position upon equalization of pressures in the usual manner, and the supply port 41 is closed by the graduating valve 25. Further reductions in train pipe pressure may be made for the purpose of increasing the brake cylinder pressure by the flow of air from the auxiliary reservoir, as will be apparent. The brakes may be released by returning the brake valve handle to release position, in which the train pipe pressure is increased and the triple valve piston shifted to release position, so that the main slide valve connects port 39 with the exhaust port 38, thus releasing the fluid in the brake cylinder to the atmosphere. By turning the brake valve handle to emergency position, shown in Fig. 7, the large exhaust port 30 is connected to the train pipe port 36, so that air is suddenly exhausted from the train pipe and the triple valve piston and main slide valve are thrown to emergency position, in which position the port 39 is uncovered and air from the auxiliary reservoir flows to chamber 20 and shifts the piston 15 so that fluid under pressure flows through passage 42 and pipe 19 to the brake cylinder. Port 33 in the rotary valve also registers with straight air port 35 in emergency position, so that fluid under pressure is admitted to the straight air pipe 7 and thence to chamber 21 at the outer face of piston head 17. According to the construction shown, the piston head 16 is of greater area than head 17, so that at first, as the air flows from pipe 22 to the brake cylinder, the pressure of the air supply on the outer face of the head 16 maintains the piston or check valve device 15 with the smaller head 17 seated and cutting off communication from the straight air pipe; but as the auxiliary reservoir pressure falls by expansion into the brake cylinder the pressures on opposite sides of head 16 become substantially balanced and the higher pressure of the direct supply passage acting on the outer face of piston head 17 forces the piston 15 over to its opposite seat, thereby closing the automatic communication to the brake cylinder and at the same time, opening communication from the direct supply through passage 40 around the piston head 17 to pipe 19 and the brake cylinder 13. The fluid at a higher pressure in the direct air pipe then flows to the brake cylinder, augmenting the pressure therein until the same is substantially equal to the full pressure of the control pipe line, as determined by the feed valve 10. It will thus be seen that a high brake cylinder pressure is secured in an emergency application of the brakes and without increasing the auxiliary reservoir pressure so as to render the subsequent release of the brakes difficult.

The brakes may be released after an emergency application by moving the motorman's brake valve handle to release position, fluid under pressure is then admitted to the train pipe and the straight air pipe is connected to the exhaust port 29. Air may then flow from the brake cylinder through the passage 40 to the straight air pipe 7 and thence to the atmosphere. The increase in train pipe pressure shifts the triple valve 23 to release position and connects the pipe 22 to the exhaust port 38. Should the flow of air from the brake cylinder to the straight air pipe diminish the pressure on one side of the piston head 16 sufficiently before the triple valve moves to release position, then the higher pressure in chamber 20 on said piston head may cause the double check valve to shift over and close the straight air pipe, but as at the same time the passage 42 is opened around the piston head 16 to the pipe 22, the remaining air in the brake cylinder is released through the pipe 22 to the exhaust port 38.

It will be noted that the brake cylinder pressure may also be increased after a full equalized service application of the brakes by turning the brake valve to straight air application position, in which position air is admitted to the straight air pipe and, as in the case of an automatic emergency application, the straight air pressure shifts the double check valve and opens the straight air communication to the brake cylinder, thereby increasing the brake cylinder pressure.

Though specially designed for electric traction service, my improvements are adapted to general use, for instance, the same may be employed on a locomotive, as will be readily understood, to obtain combined automatic and straight air control of the engine brakes.

I have thus provided an air brake having means for readily obtaining either an automatic or a straight air brake whenever desired, and wherein the ordinary emergency pressure in the brake cylinder is augmented by air from the straight air supply.

Where it is desired to provide straight air control on more than the head car the straight air pipe and the control pipe line are of course provided with couplings so as to extend from car to car.

Having now described my invention, what I claim as new and desire to secure by Letters Patent, is:

1. In a fluid pressure brake, the combination with an automatic valve device operated by a reduction in train pipe pressure to supply fluid under pressure to a brake cylinder, of a direct pipe or passage for also supplying fluid to the brake cylinder and a valve mechanism operating upon the flow of fluid from the automatic valve device to the brake cylinder, to close communication from the direct passage to the brake cylinder, and then to open said communication for supplying additional fluid to the brake cylinder.

2. In a fluid pressure brake, the combination with an automatic valve device operated by a reduction in train pipe pressure to supply fluid under pressure to a brake cylinder, of a direct pipe or passage for also supplying fluid to the brake cylinder and a valve mechanism operating upon the flow of fluid from the automatic valve device to the brake cylinder, to close communication from the direct passage to the brake cylinder, and then to open said communication for supplying additional fluid to the brake cylinder and to close communication to said automatic valve device.

3. In a fluid pressure brake, the combination with a train pipe, auxiliary reservoir, triple valve, and brake cylinder, of a direct supply pipe or passage and a valve mechanism operating upon the flow of air from the triple valve to the brake cylinder, for closing the direct supply pipe and then operating to open communication from the direct supply pipe to the brake cylinder, and to close communication to the auxiliary reservoir.

4. In a fluid pressure brake, the combination with a train pipe, auxiliary reservoir, triple valve, and brake cylinder, of a direct supply pipe or passage and a valve mechanism operating upon the flow of air from the triple valve to the brake cylinder, for closing the direct supply pipe and then operating upon equalization of the fluid pressure from the triple valve into the brake cylinder, to open communication from the supply pipe to the brake cylinder and to close communication to the triple valve.

5. In a fluid pressure brake, the combination with a train pipe and a direct or straight air supply pipe, of an automatic valve device operating upon a sudden reduction in train pipe pressure to supply air to the brake cylinder and a valve mechanism operated by the flow of air from the automatic valve device to the brake cylinder for closing communication from the direct supply pipe to the brake cylinder and then operating upon equalization of the fluid pressure flowing from the automatic valve device, to close the communication from the automatic valve device, and open communication from the direct supply pipe to the brake cylinder.

6. In a fluid pressure brake, the combination with an automatic valve device operated by a reduction in train pipe pressure to supply fluid to a brake cylinder, of a pipe or passage for also supplying fluid to the brake cylinder, and a valve mechanism operated by the flow of fluid from the automatic valve device, to close communication between the said pipe or passage and the brake cylinder, and then operated by pressure in said pipe or passage to open said communication and supply further fluid to the brake cylinder.

7. In a fluid pressure brake, the combination with a brake cylinder, and an automatic valve device operating upon a reduction in train pipe pressure to supply air to the brake cylinder, of a direct supply pipe and a valve mechanism operating upon equalization of fluid pressure from the automatic valve device to the brake cylinder to open communication from said direct supply pipe to the brake cylinder.

8. In a fluid pressure brake, the combination with a triple valve, brake cylinder, train pipe, and direct air pipe, of a brake valve having means for supplying air to said direct air pipe in emergency position, and a valve mechanism operated by the flow of air from the triple valve to the brake cylinder to close the direct supply passage to the brake cylinder and then open the same and close the communication to the triple valve.

9. In a fluid pressure brake, the combination with a brake cylinder, of a double check valve device comprising differential piston heads for controlling communication from each of two different sources of fluid pressure to the brake cylinder, the larger head being subject to the opposing pressures of the brake cylinder and one of said sources of pressure and the smaller head to the pressure of the other source of fluid pressure.

10. A double check valve device for controlling communication from each one of two sources of fluid pressure to a common outlet, comprising differential piston heads subject to the opposing pressures of one source of fluid pressure in one direction and to the pressure of the outlet and the other source in the opposite direction.

11. In a fluid pressure brake, the combination with a brake cylinder, triple valve, and direct air pipe, of a valve mechanism for controlling the supply of air from said triple valve and from the direct air pipe to the brake cylinder, said valve mechanism comprising differential piston heads subject to the opposing pressures of fluid from the triple valve in one direction and from the direct air pipe and the brake cylinder in the opposite direction.

12. In a fluid pressure brake, the combination with a triple valve, brake cylinder, train pipe, and straight air pipe, of a valve mechanism for governing communication from the triple valve and from the straight air pipe to the brake cylinder, and a brake valve having means for supplying air to the train pipe and for connecting the straight air pipe to the atmosphere in release position thereof.

13. In a fluid pressure brake, the combination with a triple valve, brake cylinder, train pipe, and straight air pipe, of a valve mechanism for governing communication from the triple valve and from the straight air pipe to the brake cylinder, and a brake valve having means for venting air from the train pipe and for supplying air through the straight air pipe to the brake cylinder in the emergency position at the full pressure carried in the system.

14. In a fluid pressure brake, the combination with a train pipe and brake cylinder, of an automatic valve device operated upon a reduction in train pipe pressure for supplying air to the brake cylinder, a direct pipe or passage, a brake valve adapted to supply air at the same pressure both to the train pipe and said direct pipe or passage, and means governed by the opposing pressures from the automatic valve device and in the direct pipe for first opening communication from the automatic valve device to the brake cylinder then closing said communication and opening the direct pipe or passage to the brake cylinder to augment the brake cylinder pressure.

15. In a combined automatic and straight air brake, the combination with an automatic valve device for supplying air to the brake cylinder upon a reduction in train pipe pressure, a direct passage, and a brake valve having means for supplying air to the direct passage, of a valve mechanism operated by the flow of air from the automatic valve device for opening communication from said automatic valve device to the brake cylinder and by brake cylinder pressure and pressure in the direct passage for closing said automatic communication and opening the direct passage to the brake cylinder.

16. In a fluid pressure brake, the combination with an automatic valve device operating upon a reduction in train pipe pressure for supplying air to the brake cylinder, of a direct pipe or passage, a brake valve having means for supplying air to the brake cylinder through said direct passage, and means controlling communication from the automatic valve device and from the direct passage to the brake cylinder and operating at equal pressures in the direct passage and that supplied from the automatic valve device for opening communication from the automatic valve device and for closing communication from the direct passage to the brake cylinder.

In testimony whereof I have hereunto set my hand.

WALTER V. TURNER.

Witnesses:
R. F. EMERY,
WM. M. CODY.